(12) United States Patent
Tsai et al.

(10) Patent No.: US 7,813,267 B2
(45) Date of Patent: Oct. 12, 2010

(54) METHOD AND SYSTEM FOR PROVIDING CONTROL PLANE RESILIENCY WITH UNDISRUPTED FORWARDING IN A DATA NETWORK

(75) Inventors: Chia Tsai, Cupertino, CA (US); Xinhua Zhao, Newark, CA (US); Bhanu Gopalasetty, San Jose, CA (US); Bhawani Sapkota, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 11/468,271

(22) Filed: Aug. 29, 2006

(65) Prior Publication Data

US 2008/0056121 A1 Mar. 6, 2008

(51) Int. Cl.
*H04J 1/16* (2006.01)

(52) U.S. Cl. .................. 370/218; 370/216; 370/217; 370/241; 370/242; 370/244

(58) Field of Classification Search ......... 370/216–218, 370/241, 242, 244–245, 248, 250, 310, 351–357, 370/386, 387
See application file for complete search history.

(56) References Cited

U.S. PATENT DOCUMENTS

| | | | |
|---|---|---|---|
| 7,411,925 B2 | 8/2008 | Nain et al. | |
| 7,453,797 B2 * | 11/2008 | Deval et al. | 370/218 |
| 2003/0193890 A1 * | 10/2003 | Tsillas et al. | 370/216 |
| 2005/0157674 A1 * | 7/2005 | Wentink | 370/328 |
| 2005/0270992 A1 | 12/2005 | Sanzgiri et al. | |
| 2006/0002343 A1 * | 1/2006 | Nain et al. | 370/331 |
| 2006/0018253 A1 * | 1/2006 | Windisch et al. | 370/216 |
| 2006/0039392 A1 * | 2/2006 | Krapp | 370/410 |
| 2008/0019302 A1 * | 1/2008 | Nagarajan et al. | 370/328 |

OTHER PUBLICATIONS

Answers.com. authenticate. Jun. 19, 2009. <http://www.answers.com/topic/authenticate>.*
Dictionary.com. authenticate. Jun. 19, 2009. <http://dictionary.reference.com/browse/authenticate.*
"Cisco Mobile IP," Cisco Systems, Inc., 2001, pp. 1-8.
"Cisco Catalyst 6500 Series Wireless LAN Services Module: White Paper," Cisco Systems, Inc., 2004, pp. 1-16.
"Cisco Catalyst 6500 Series Wireless Lan Services Module: Detailed Design and Implementation Guide," Cisco Systems, Inc., 2004, pp. 1-88.

* cited by examiner

*Primary Examiner*—William Trost, IV
*Assistant Examiner*—Ashil Farahmand
(74) *Attorney, Agent, or Firm*—Cesari and McKenna, LLP; Michael R. Reinemann

(57) ABSTRACT

Method and system for providing continuous data forwarding during a failure mode in a wireless data network including detecting a control plane failure mode of a network switch, maintaining data path between one or more network entities with the network switch, detecting the network switch recovery from the control plane failure mode, and re-authenticating the one or more network entities over the data network is disclosed without disrupting data traffic forwarding.

24 Claims, 5 Drawing Sheets

METHOD AND SYSTEM FOR PROVIDING CONTROL PLANE RESILIENCY WITH UNDISRUPTED FORWARDING IN A DATA NETWORK

FIELD OF THE INVENTION

The present invention relates to data switching network. More specifically, the present invention relates to method and system for providing control plane resiliency with undisrupted data forwarding in wireless data networks.

BACKGROUND

In complex data networks, the operation of data plane involving switches or routers depends heavily on the operational functionality of the associated control plane. Indeed, providing redundancy and low latency failover of control plane is important to minimizing data network downtime and maintaining the network availability which is generally costly and complex to implement and support.

In a deployed wireless local area network (WLAN) supporting layer-3 mobility, there are three main components including Access Points (APs), Wireless Domain Service (WDS) on the Wireless LAN Service Module (WLSM), and Layer-3 Mobility Module (L3MM) on Route Processor. The Access Point (AP) in the wireless LAN is configured to provide a communication link (for example, a radio connectivity) to a Mobile Node (MN) on the wireless LAN. In addition, the Access Points (APs) also is configured for network connectivity to the wireless domain service (WDS) and to tunnel the mobile node's (MN) data traffic to the central switch (CS) through the wired LAN, and to communicate with the WDS for control plane signaling. The layer-3 mobility module (L3MM) on the router processor of the central switch is configured to handle the management of multi-endpoint GRE tunnels (mGRE tunnels) to the access points (APs).

Moreover, in the wireless local area network (WLAN), the wireless domain service (WDS) is configured to actively interact with the layer-3 mobility module (L3MM) and the access points (APs). That is, the wireless domain service (WDS) is configured to handle the mobile node (MN) authentication and to maintain the session states for each mobile node (MN) connected to the respective access points (APs) in the wireless local area network (WLAN).

Due to the complexity and high cost associated with providing a stateful switchover for failed wireless LAN service module (WLSM), the wireless local area networks may not be configured with wireless LAN service module redundancy support. In such a case, when the wireless LAN service module (WLSM) fails, the layer-3 mobility module running on the Route Processor and the access points (APs) starts to clean up the entries for all connected mobile nodes (MNs) and tearing down the corresponding tunnels for data traffic to and/or from the mobile nodes (MNs), while the Route Processor attempts to reset the failed wireless LAN service module (WLSM) or to switch to a stateless backup wireless LAN service module (WLSM).

This results in data traffic disruption for all mobile nodes (MNs) in the wireless local area network (WLAN) for the time period during which the wireless LAN service module (WLSM) is rebooted or initialized, and thereafter each mobile node (MN) completes its registration process with the wireless domain service (WDS) of the rebooted wireless LAN service module.

In view of the foregoing, it would be desirable to have methods and systems for providing cost effective wireless LAN service module failure recovery with no disruption to data traffic for the existing authenticated mobile nodes (MNs) during the failure and subsequent recovery, and which provides significant reduction in costs associated with development and implementation of redundant hardware to support the wireless LAN service module failure recovery process.

SUMMARY OF THE INVENTION

In accordance with the various embodiments of the present invention, there are provided methods and systems for providing wireless LAN service module recovery mechanism in wireless local area networks with no data traffic disruption for existing authenticated mobile nodes that do not roam before the session state is refreshed during the wireless LAN service module recovery process.

These and other features and advantages of the present invention will be understood upon consideration of the following detailed description of the invention and the accompanying drawings.

DETAILED DESCRIPTION

Figure 1:
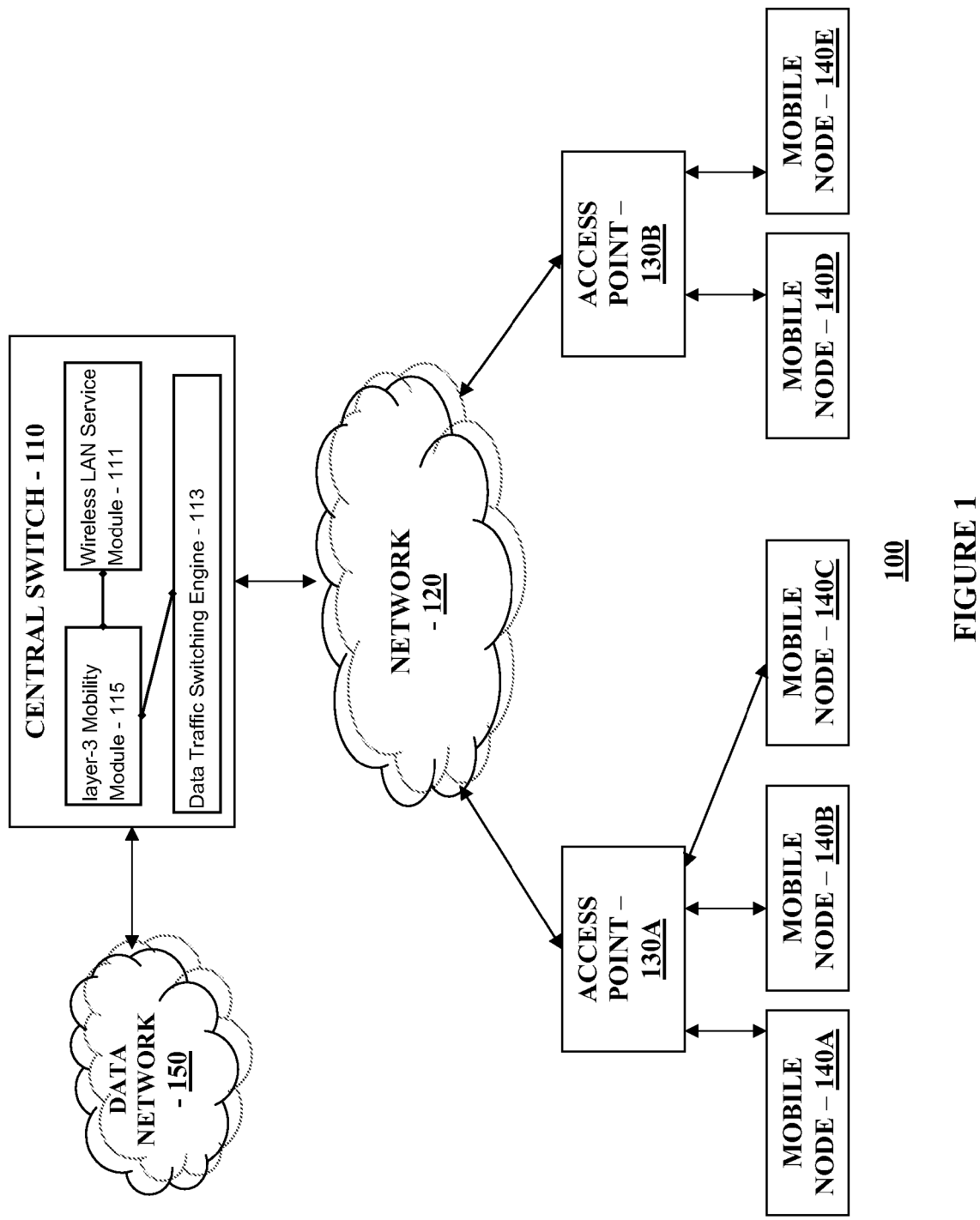
FIG. 1 is a block diagram of an overall data network for practicing one or more embodiments of the present invention.

FIG. 1 is a block diagram of an overall data network for practicing one or more embodiments of the present invention. Referring to FIG. 1, the wireless local area network (WLAN) 100 includes a central switch 110 which includes a wireless LAN service module (WLSM) 111 on a linecard. In one embodiment, the wireless LAN service module (WLSM) 111 is provided with wireless domain service (WDS) residing thereon. Referring to FIG. 1, the central switch 110 also includes layer-3 mobility module (L3MM) 115 which is coupled to the wireless LAN service module (WLSM) 111 linecard. In addition, the layer-3 mobility module (L3MM) 115 in one embodiment is coupled to a data traffic switching engine 113 (for example, a data path module) which, in one embodiment, is configured to maintain forwarding information for each entity in the wireless local area network 100 coupled to the central switch 110.

In one aspect, the layer-3 mobility module (L3MM) 115 is configured to control the data plane of the central switch 110 for the wireless data traffic in the wireless local area network 100. As discussed in further detail below, when the wireless LAN service module (WLSM) 111 enters a failure mode, the data path states stored in the data traffic switching engine 113 is rendered stale, and upon recovery from the failure mode of the wireless LAN service module (WLSM) 111, the data path states in the data traffic switching engine 113 are refreshed or updated.

Referring back to FIG. 1, the central switch 110 is operatively coupled to a data network 120. As shown in the Figure, the data network 120 is also operatively coupled to a plurality of access points (APs) 130A, 130B. In addition, referring again to FIG. 1, each access point (AP) 130A, 130B is operatively coupled to one or more mobile nodes (MNs) 140A, 140B, 140C, 140D, 140E. While only two access points (APs) 130A, 130B, and five mobile nodes (MNs) 140A, 140B, 140C, 140D, 140E are shown in FIG. 1, within the scope of the present invention, there may be provided a large number of access points (for example, approximately 600 access points (APs) operatively coupled to the central switch 110, where each access point (AP) supporting approximately ten (10) mobile nodes (MNs)).

Referring again to FIG. 1, also shown is data network 150 which is operatively coupled to central switch 110. That is, the central switch 110 in one embodiment may be configured to be coupled to other data networks. Moreover, in the wireless local area network (WLAN) 100, each mobile node (MN) 140A, 140B, 140C, 140D, 140E may be configured to roam so as to connect to a different access point (AP) 130A, 130B such that for example, mobile node (MN) 140A may roam from its connection to access point (AP) 130A to access point (AP) 130B.

In operation, each mobile node (MN) 140A, 140B, 140C, 140D, 140E is configured to forward data traffic to and from the central switch 110 via the respective access point (AP) 130A, 130B over the data network 120, and where the data traffic switching engine 113 in the central switch 110 is configured to store the data path state information for each mobile node (MN) 140A, 140B, 140C, 140D, 140E that has been authenticated by the wireless LAN service module (WLSM) 111. That is, the access points (APs) 130A, 130B provide wireless connection to each respective mobile nodes (MNs) 140A, 140B, 140C, 140D, 140E and tunnels data traffic from the mobile nodes (MNs) 140A, 140B, 140C, 140D, 140E to the central switch 110. Moreover, the wireless domain service (WDS) on the wireless LAN service module 111 is configured to perform authentication of the mobile nodes (MNs) 140A, 140B, 140C, 140D, 140E and maintain session states for each mobile node (MN) 140A, 140B, 140C, 140D, 140E.

Figure 2:
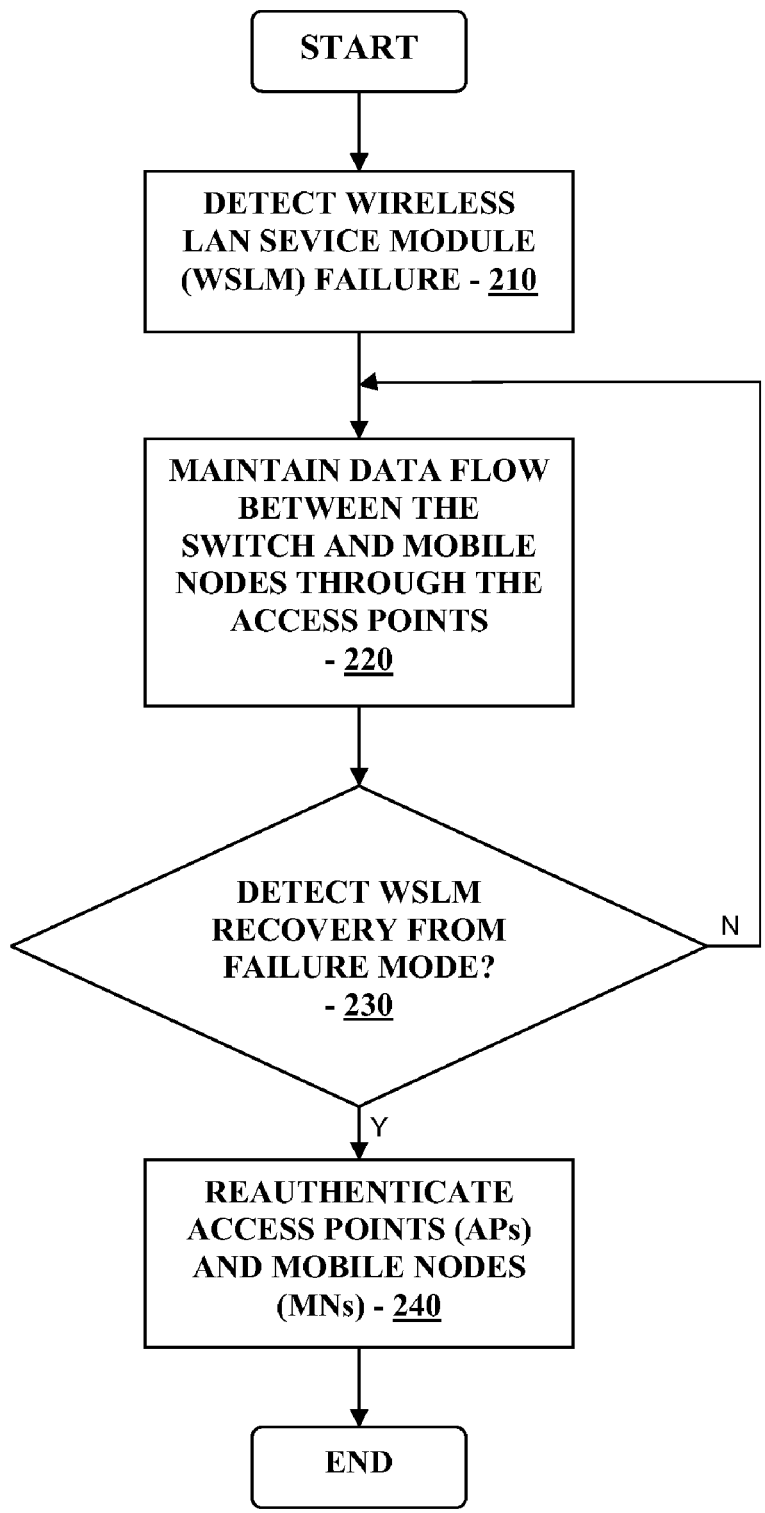
FIG. 2 is a flowchart illustrating the wireless LAN service module failure mode recovery procedure in a wireless local area network in accordance with one embodiment of the present invention.

FIG. 2 is a flowchart illustrating the wireless LAN service module failure mode recovery procedure in a wireless local area network in accordance with one embodiment of the present invention. Referring to FIG. 2, at step 210, the failure state of the wireless LAN service module (WLSM) 111 (FIG. 1) is detected, for example, through platform events or by a keep-alive timeout. Thereafter at step 220 and as discussed in further detail in conjunction with FIGS. 3 and 4, the layer 3 mobility module (L3MM) 115 in the central switch 110 which controls the central switch data plane enters a WLSM-less autopilot state, and in conjunction with the access points (APs) 130A, 130B, the layer 3 mobility module (L3MM) 115 are configured to maintain the data flow between the central switch 110 and the mobile nodes (MNs) 140A, 140B, 140C, 140D, 140E (which have been authenticated prior to the failure mode of the wireless LAN service module (WLSM) 111).

Referring back to FIG. 2, while the wireless LAN service module (WLSM) 111 is performing a recovery process to exit the failure mode, the network 100 in one embodiment of the present invention is configured to maintain the data flow being forwarded from each of the existing authenticated mobile nodes (MNs) 140A, 140B, 140C, 140D, 140E as discussed above at step 220. Thereafter, at step 230 it is determined whether the wireless LAN service module (WLSM) 111 has recovered from its failed state, for example, by executing a rebooting procedure, and reestablishing connections with the access points (APs) 130A, 130B, and the layer 3 mobility module (L3MM) 115.

If it is determined at step 230 that the wireless LAN service module (WLSM) 111 has not emerged from the failed state, then the routine returns to step 220, to continue to maintain the data flow between the central switch 110 and the mobile nodes (MNs) 140A, 140B, 140C, 140D, 140E, for example, for a predetermined time period during which the wireless LAN service module (WLSM) 111 recovery process from the failed state is in progress. On the other hand, if at step 230 it is determined that the wireless LAN service module (WLSM) 111 has recovered from its failed state, then at step 240, the wireless domain service (WDS) resident on the recovered wireless LAN service module (WLSM) 111 initiates the reauthentication procedure for the access points (APs) and the respective mobile nodes (MNs) 140A, 140B, 140C, 140D, 140E, as described for example below in conjunction with FIG. 5.

In the manner described above, in one embodiment of the present invention, when the wireless LAN service module (WLSM) 111 fails temporarily and during its recovery period to exit the failure mode, the layer 3 mobility module (L3MM) 115 is configured to maintain the existing data paths from the authenticated mobile nodes (MNs) 140A, 140B, 140C, 140D, 140E, instead of entering a reset mode to initialize its settings in response to the failed state of the wireless LAN service module (WLSM) 111.

Figure 3:
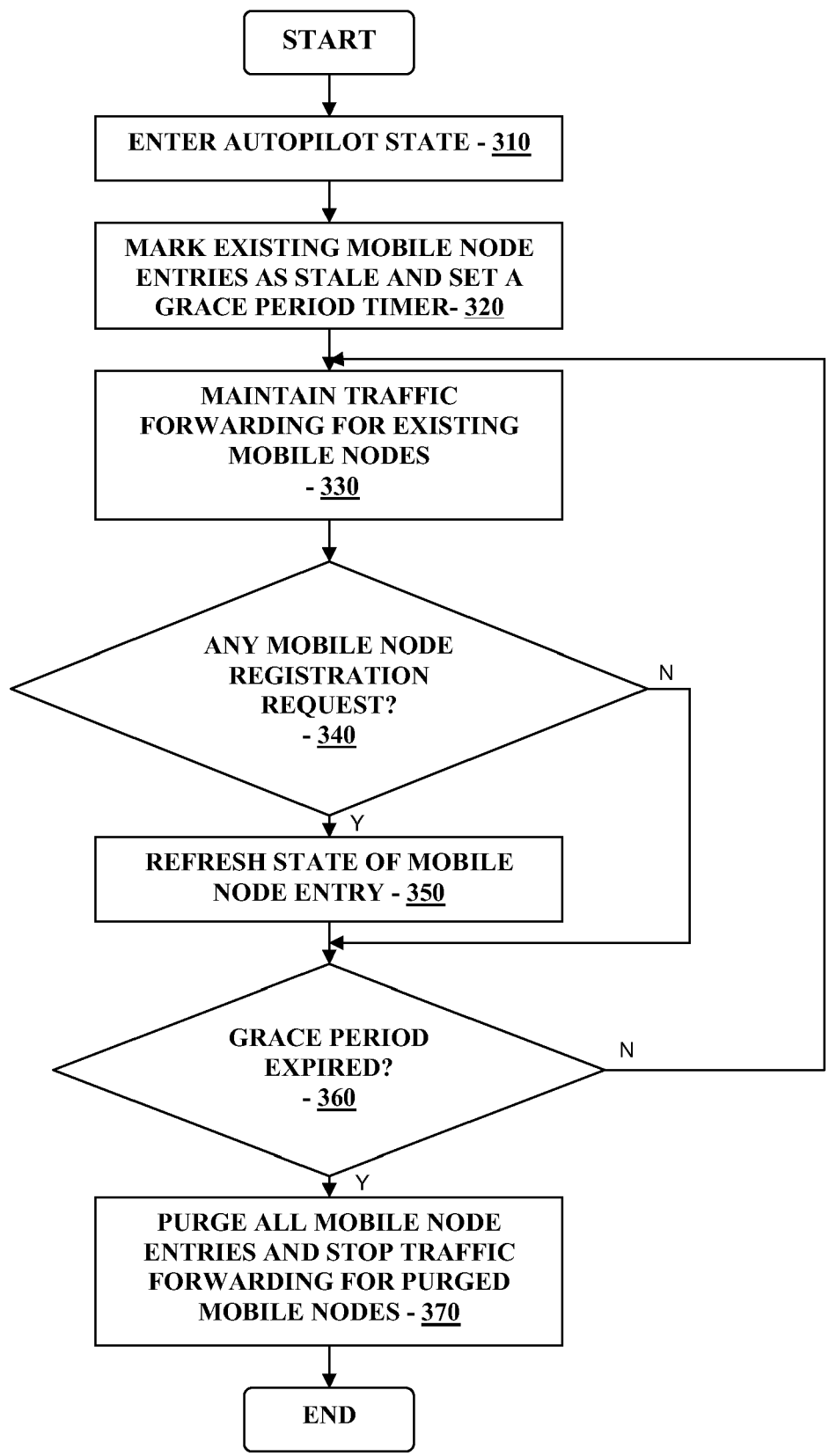
FIG. 3 is a flowchart illustrating a procedure to maintain the data forwarding from the mobile nodes to the central switch during the WLSM failure mode and the post failure mode procedures performed by the layer-3 mobility module (L3MM) in the wireless local area network in accordance with one embodiment of the present invention.

FIG. 3 is a flowchart illustrating a procedure to maintain the data forwarding from the mobile nodes to the central switch during the WLSM failure mode and the post failure mode procedures performed by the layer-3 mobility module (L3MM) in the wireless local area network in accordance with one embodiment of the present invention. Referring to FIG. 3, when the wireless LAN service module (WLSM) 111 has entered a failure mode, the layer 3 mobility module (L3MM) 115 enters the WLSM-less autopilot state at step 310.

In one aspect, the layer 3 mobility module (L3MM) 115 determines that the wireless LAN service module (WLSM) 111 has entered a failure mode when one of the following events occur: (1) the WLSM linecard is powered down or removed, (2) the layer 3 mobility module (L3MM) 115 fails to receive at least three consecutive keep alive messages from the wireless domain service (WDS) on the wireless LAN service module (WLSM) 111, or (3) an explicit keep alive message from an otherwise standby wireless domain service (WDS) on the same chassis in a redundant WLSM configuration is received indicating that it has become the active wireless domain service (WDS).

Referring back to FIG. 3, at step 320, the layer 3 mobility module (L3MM) 115 in one embodiment is configured to mark the existing mobile node (MN) entries as stale (for example, in the data traffic switching engine 113) and set a grace period timer to define a predetermined time period during which the mobile node (MN) entries may remain in the stale state. As discussed in further detail below, the grace period timer establishes the maximum predetermined time period during which the layer 3 mobility module (L3MM) 115 may operate in the autopilot state following the detection of state loss at the wireless LAN service module (111). In one embodiment, the predetermined time period may span the period during which the layer 3 mobility module (L3MM) 115 operates in the WLSM-less autopilot state and the subsequent time period of mobile node session state restoration process. In one aspect, when the predetermined time period expires, all stale mobile node entries are purged and the corresponding mGRE tunnels are removed. Within the scope of the present invention, other approaches to optimize the grace period timer may be implemented.

After marking the existing mobile node (MN) entries as stale, the layer 3 mobility module (L3MM) 115 is also configured at step 330 to maintain the tunnel interface states and endpoint database for the existing mobile nodes (MNs) 140A, 140B, 140C, 140D, 140E (FIG. 1) without disrupting the ongoing data traffic forwarding of the existing mobile nodes (MNs) 140A, 140B, 140C, 140D, 140E. That is, in one embodiment, the traffic forwarding for existing mobile nodes are maintained at step 330.

Thereafter at step 340, it is determined whether any mobile node registration request is received. If it is determined at step 340 that mobile node registration request is received, then at step 350, the state of the mobile node entry is refreshed, and thereafter, at step 360, it is determined whether the grace period timer has expired. On the other hand, if at step 340 it is determined that mobile node registration request is not received, then the routine in one embodiment skips step 350, and proceeds to step 360 where it is determined whether the grace period timer has expired.

For example, in one embodiment, the layer 3 mobility module (L3MM) 115 monitors the status of the wireless LAN service module (WLSM) 111 by, for example, listening for platform events or send out a L3M Communication Protocol (LCP) session initialization request message at a low frequency. If a platform notification indicating that the wireless LAN service module (WLSM) 111 is back online, or a keep alive message is received from a newly active wireless domain service (WDS) (if HSRP is in use for wireless LAN service module redundancy), then, the layer 3 mobility module (L3MM) 115 may be configured to reestablish active connection with the recovered wireless LAN service module (WLSM) 111.

Referring back to FIG. 3, if at step 360 it is determined that the grace period timer has not expired, then the routine returns to step 330 and repeats the processes as described above in conjunction with steps 330 to 360. More specifically, in one embodiment of the present invention, the layer 3 mobility module (L3MM) 115 is configured to maintain the data traffic forwarding for the existing mobile nodes (MNs) 140A, 140B, 140C, 140D, 140E, and additionally, the layer 3 mobility module (L3MM) 115 is configured to start servicing request from the wireless domain service (WDS) on the recovered wireless LAN service module (WLSM) 111, and refreshes the mobility database and tunnel endpoints as new access point (AP) and mobile node (MN) update requests are processed.

On the other hand, when it is determined at step 360 that the grace period timer has expired, then the layer 3 mobility module (L3MM) 115 in one embodiment is configured to purge all mobile nodes (MNs) that have not been refreshed and traffic forwarding for the purged mobile nodes (MNs) are stopped, while data forwarding for existing mobile nodes (MNs) are maintained without having their states refreshed following the failure of the wireless LAN service module (WLSM) 111.

Figure 4:
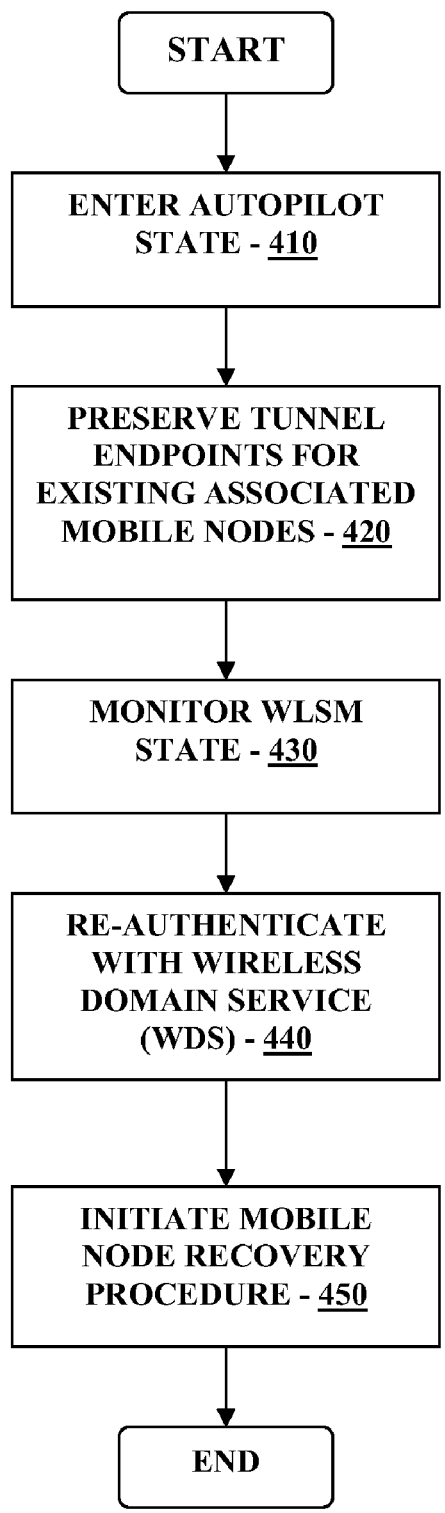
FIG. 4 is a flowchart illustrating a procedure to maintain the data forwarding from the mobile nodes to the central switch during the WLSM failure mode and the post failure mode procedures performed by the access points (APs) in the wireless local area network in accordance with one embodiment of the present invention.

FIG. 4 is a flowchart illustrating a procedure to maintain the data forwarding from the mobile nodes to the central switch during the WLSM failure mode and the post failure mode procedures performed by the access points (APs) in the wireless local area network in accordance with one embodiment of the present invention. Referring to FIG. 4, when the wireless LAN service module (WLSM) 111 fails and enters a failure mode, at step 410, the access points (APs) 130A, 130B connected to the central switch 110 enter a WLSM-less autopilot state. For example, in one embodiment, when the access points (APs) 130A, 130B detect communication failure with the wireless LAN service module (WLSM) 111 in the central switch 110 indicating failed state of the wireless LAN service module (WLSM) 111, or similarly, it fails to receive a keep alive message for a certain timeout or three repetitions of a request message that do not elicit a response from the wireless domain service (WDS) on the wireless LAN service module (WLSM) 111, the access points (APs) 130A, 130B enter the WLSM-less autopilot state rather than initiating a reset procedure.

Referring back to FIG. 1, upon entering the WLSM-less autopilot state at step 410, the access points (APs) 130A, 130B at step 420 are configured to maintain the tunnel endpoints of the respective mobile nodes (MNs) 140A, 140B, 140C, 140D, 140E, correspondingly coupled thereto to maintain the data traffic forwarding for the existing associated mobile nodes (MNs) 140A, 140B, 140C, 140D, 140E. With the tunnel endpoints preserved for the existing authenticated mobile nodes (MNs) 140A, 140B, 140C, 140D, 140E at step 420, the access points (APs) 134A, 130B at step 430 are configured in one embodiment to monitor the operating state of the wireless LAN service module (WLSM) 111 in the central switch 110.

Referring again to FIGS. 2 and 4, when the wireless LAN service module (WLSM) 111 emerges from the failure mode and recovers for example, by rebooting and, the access points (APs) 130A, 130B are configured at step 440 to re-authenticate themselves with the wireless domain service (WDS) of the wireless LAN service module (WLSM) 111. For example, upon emerging from the failure mode, an advertisement reply from the wireless domain service (WDS) causes the access points (APs) 130A, 130B to start their registration, and to return to the normal registered state. Upon completion of the registration, the access points (APs) 130A, 130B are configured to send a Wireless LAN Context Control Protocol (WLCCP) Session Refresh Message with a list of mobile nodes (MNs) that are still associated with each access point (AP) 130A, 130B.

Referring back to FIG. 4, after re-authenticating with the wireless domain service (WDS) at step 440, the access points (APs) 130A, 130B at step 450 are configured to initiate mobile node recovery process to restore the mobile node states on the wireless domain service (WDS) as well as on the layer 3 mobility module (L3MM) 115. The mobile node recovery process in one embodiment may be triggered by the re-authentication of the mobile nodes (MNs) 140A, 140B, 140C, 140D, 140E, respectively associated with the corresponding access point (AP) 130A, 130B prior to the wireless LAN service module (WLSM) failure based on a predetermined re-authentication procedure as described in further detail below in conjunction with FIG. 5.

In a network provided with a redundant wireless LAN service module (WLSM) in the same chassis, the failure recovery mechanism described above may shorten the time period of the WLSM-less autopilot state such that the mobile node state refreshing or re-authentication stage may be initiated as soon as the redundant wireless LAN service module (WLSM) assumes the active role. In addition, the new mobile node authentication and mobile node roaming (for example, between access points) may be supported sooner than in the case of a single wireless LAN service module (WLSM) operation mode.

In addition, in one aspect of the present invention, inter-switch wireless LAN service module (WLSM) failover is also supported. That is, when switching over from a wireless LAN service module on one switch to another wireless LAN service module (WLSM) on another switch in the network, data forwarding may be disrupted. Thus, the inter-switch wireless LAN service module (WLSM) redundancy configuration may include two wireless LAN service modules (WLSMs) on each switch. In this case, when one wireless LAN service module (WLSM) on a particular switch fails, the other wireless LAN service module (WLSM) on the same chassis may take over in an active mode to ensure continuous data traffic forwarding.

Failover between wireless LAN service modules (WLSMs) use HSRP to select active wireless LAN service module (WLSM) and LCP communication between the layer 3 mobility module (L3MM), and wireless domain service (WDS) is used for signaling the redundancy status of each wireless LAN service module (WLSM). To ensure that the wireless LAN service module (WLSM) on the same switch as the current active assumes the hot standby role, automatic HSRP priority boosting mechanism may be implemented such that all wireless LAN service module (WLSM) on the switch with the active wireless LAN service module (WLSM) are set to a higher priority (for example, 255), while wireless LAN service modules (WLSMs) on the other switch is configured to use a lower HSRP priority (for example, 100). This may be dynamically adjusted based on the location of the active wireless LAN service module (WLSM).

Figure 5:
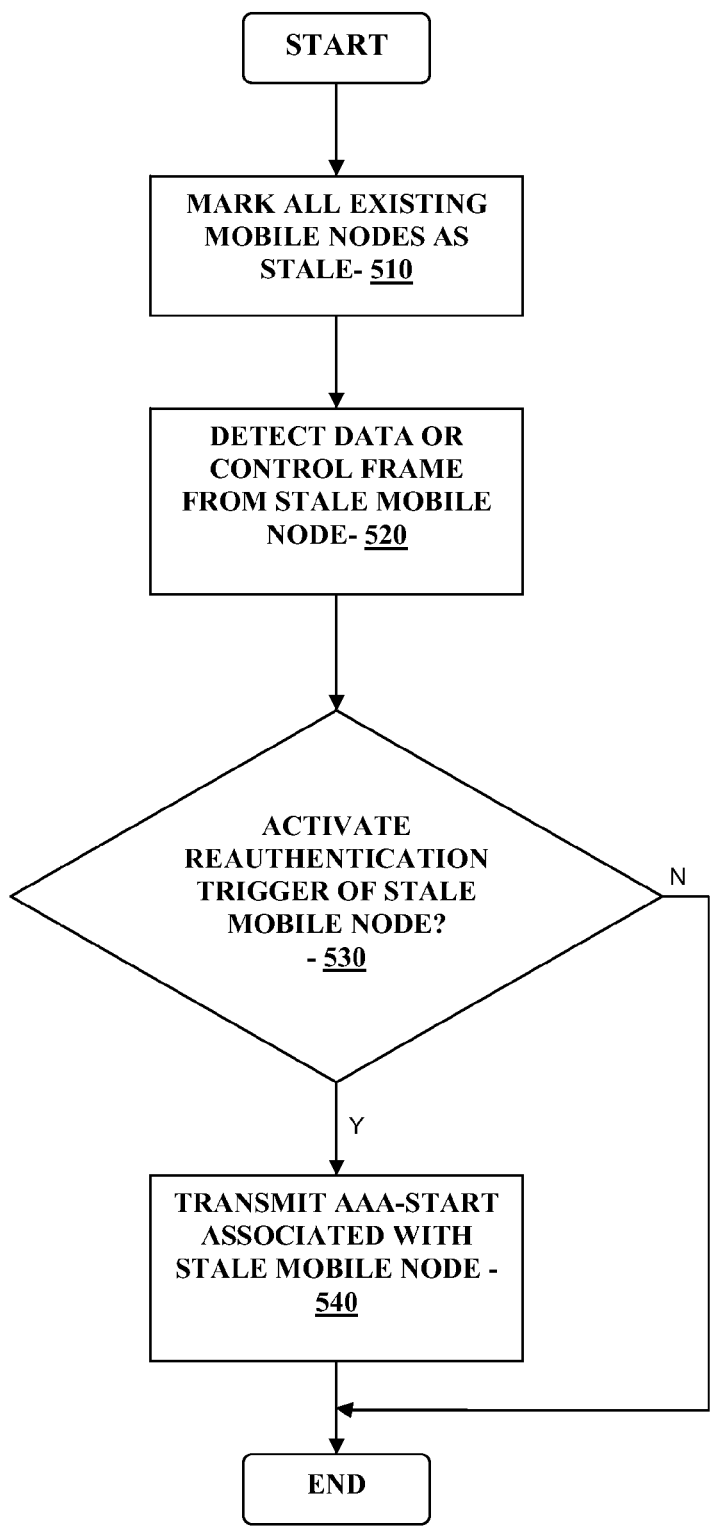
FIG. 5 is a flowchart illustrating the network entity reauthentication procedure in the wireless local area network in accordance with another embodiment of the present invention.

FIG. 5 is a flowchart illustrating the network entity reauthentication procedure in the wireless local area network in accordance with another embodiment of the present invention. When the wireless LAN service module (WLSM) 111 emerges from its failed state and the access points (APs) 130A, 130B have re-authenticated with the recovered wireless LAN service module (WLSM) 111, the access points (APs) 130A, 130B start the mobile node recovery procedure (as described above, for example, in conjunction with FIG. 4, at step 450).

Referring now to FIG. 5, at step 510, all existing mobile nodes (MNs) 140A, 140B, 140C, 140D, 140E (FIG. 1) are marked as stale. Thereafter at step 520, the access points (APs) 130A, 130B are configured to detect data or control frame information from the corresponding stale mobile nodes (MNs) 140A, 140B, 140C, 140D, 140E respectively coupled thereto. Upon receiving data or control frame information from a respective one or more of the stale mobile nodes (MNs) 140A, 140B, 140C, 140D, 140E, the associated coupled access point determine whether to trigger or activate re-authentication process for the stale mobile node based on one or more predefined parameters at step 530.

Referring again to FIG. 5, if at step 530 the access points (APs) 130A, 130B determine not to trigger the re-authentication process for the stale mobile node from which data or control frame information was received, then the procedure shown in FIG. 5 terminates. On the other hand, if at step 530 the access points (APs) 130A, 130B triggers the re-authentication process for the stale mobile node from which data or control frame information was received, then at step 540, the access points (APs) 130A, 130B transmits AAA-start (e.g., IEEE 801.1x protocol message) associated with the stale mobile node which is in the process of being re-authenticated with the recovered wireless LAN service module (WLSM) 111 in the central switch 1110.

In one embodiment, the predetermined parameters for determining whether to trigger the re-authentication procedure for the stale mobile node includes, but not limited to (1) whether re-authentication has already been triggered for the particular stale mobile node, (2) whether the frame count for the stale mobile node has reached a predetermined threshold level, or (3) whether the number of stale mobile nodes in the process of re-authentication by the access points (APs) 130A, 130B has reached or exceeds a predetermined limit as a predefined percentage of the total number of stale mobile nodes on the particular access point coupled thereto.

More specifically, the determination whether the frame count for the stale mobile node has reached a predetermined threshold level allows temporal spacing of the re-authentication procedure triggering so as to lessen the potential processing load at a given point of time. In addition, the determination of whether the number of stale mobile nodes in the process of re-authentication by the access points has reached or exceeds a predetermined limit allows minimizing disproportionately large number of re-authentication requests on a particular access point during the mobile node re-authentication procedure.

Moreover, in one embodiment of the present invention, the wireless domain service (WDS) on the recovered wireless LAN service module (WLSM) 111 does not actively participate in the determination of the order of re-authentication procedure triggered for each mobile node (MNs) 140A, 140B, 140C, 140D, 140E. However, the wireless domain service (WDS) may be configured to provide a throttling mechanism to regulate the rate at which each access point (AP) 130A, 130B triggers re-authentication of the respective stale mobile nodes (MNs) 140A, 140B, 140C, 140D, 140E during the re-authentication process.

Accordingly, by using a logical decoupling of the data and control planes, data traffic may be preserved when the control plane experiences a temporary failed state. In addition, the simplified state restoration of the controlled network entities (e.g., the mobile nodes) on the control plane (e.g., wireless domain service (WDS)) using a paced state restoration or recreation rather than stateful switchover to a synchronized redundant control plane. There is also provided a balanced algorithm for determining the pace of triggering the state recreation through the re-authentication of each mobile node, as well as a dynamic HSRP priority adjustment mechanism for supporting a graceful wireless LAN service module recovery process in the inter-switch wireless LAN service module redundancy configuration.

In this manner, in accordance with the various embodiments of the present invention, the data and control planes in the wireless local area network may be decoupled to allow WLSM-less operation of data forwarding during the temporary outage of the control plane. Furthermore, stateless recovery of session states on the control plane on the wireless domain service (WDS) may be provided by paced or scheduled triggers of reauthentication of the network entities such as the mobile nodes (MNs).

More specifically, within the scope of the present invention, data plane functionality is maintained in the wireless local area network including data traffic forwarding of existing and authenticated mobile nodes whose credentials already exist in the corresponding access points (APs) from prior established sessions when the control plane temporarily fails. In addition, the states of each mobile node (MN) is restored by triggering reauthentication of the mobile nodes (MNs) upon the recovery of the wireless LAN service module, rather than maintaining all mobile node (MN) session states on a standby wireless LAN service module (WLSM).

In this manner, the existing mobile nodes will continue to forward data traffic to the wireless switch via the corresponding access points (APs) even during the temporary failure state of the control plane in the wireless LAN service module, thus providing improved network availability with minimized down time.

Accordingly, in one embodiment, in the pacing mechanism for determining the reauthentication order on a particular access point (AP), the mobile node re-authentication process better matches the characteristics of radio interface to achieve rate-limiting or acceleration of the re-authentication processes being triggered. Furthermore, no separate randomization mechanism is needed since the randomization is traffic-driven on the access point. In addition, the triggered re-authentication may be provided with a heuristic scheduling such that the active mobile nodes are triggered for re-authentication prior to the idle mobile nodes.

Moreover, the pacing or scheduling of the re-authentication process described above, follows the authentication pattern that may occur during normal operating state (for example, when the wireless LAN service module (WLSM) 111 does not experience a failure mode, and is in normal operating condition for authenticating additional mobile nodes in the network). Also, in one aspect, the ordering of re-authentication is provided with some adaptive mechanism based on the activity of each mobile node (MN) as compared with the serialized authentication scheduling by the wireless domain service (WDS) since mobile nodes coupled to an access point that registers with the wireless domain service (WDS) at a later time is not penalized.

In this manner, in accordance with the various embodiments of the present invention, network availability may be increased, with a reduced potential for wireless LAN service module (WLSM) being the single point of failure for all wireless traffic in the network. In addition, non-disruptive software upgradability with a single wireless LAN service module may be provided at a low cost. Moreover, there is provided a universal solution applicable to a single wireless LAN service module failure/restart, as well as to intra-chassis dual wireless LAN service module redundant system, and to inter-chassis distributed wireless LAN service module system.

Accordingly, a method of providing continuous data forwarding during a failure mode in a data network in one embodiment of the present invention includes detecting a control plane failure mode of a network switch, maintaining data path between one or more network entities with the network switch, detecting the network switch recovery from the control plane failure mode, re-authenticating the one or more network entities over the data network.

In one aspect, detecting the control plane failure mode may include the step of detecting a communication path loss over the data network, where the communication path loss may include a communication failure between a data plane management component and the control plane.

In a further aspect, the communication path loss may include one or more of an absence of a keep alive message or a non-acknowledgement of a keep alive message from the network switch.

The data network in one aspect may include a wireless data network.

Additionally, the step of maintaining the data path in one embodiment may include the step of preserving one or more tunnel endpoints associated with the respective one or more network entities.

In another aspect, the step of re-authenticating the one or more network entities may include marking each of the one or more network entities as stale, and performing a predetermined scheduling of the re-authentication of the one or more network entities.

Additionally, the step of performing the predetermined scheduling of the re-authentication includes receiving data from one or more network entities, determining re-authentication priority based on one or more predetermined parameters, executing re-authentication of the one or more network entities with the network switch, where the one or more predetermined parameters may include re-authentication status of the one or more network entities, a frame count of the respective one or more network entities, and the number of the one or more network entities in the re-authentication process.

A method of providing continuous data forwarding during a failure mode in a data network in accordance with another embodiment of the present invention includes detecting a failure mode state of a network switch, marking one or more network entities in the network as stale, maintaining tunnel interface states and endpoint database of the one or more network entities in the data network.

In one aspect, the method may further include the steps of detecting a normal operational mode of the network switch, and updating a state of the one or more network entities with the network switch based on a predetermined re-authentication schedule.

Additionally, the step of updating the state may include the step of determining the re-authentication priority for each of the one or more network entities.

In still another aspect, the method may further include the step of purging the one or more network entities whose state is not updated.

Moreover, the step of maintaining the tunnel interface states and the endpoint database may include the step of forwarding data from the one or more network entities to the network switch.

A system for providing continuous data forwarding during a failure mode in a data network in yet another embodiment of the present invention includes a controller unit operatively coupled to a data network, the controller unit configured to detect a control plane failure mode of a network switch, maintain a respective one or more data paths between one or more network entities with the network switch, detect the network switch recovery from the control plane failure mode, refresh a data forwarding state of the one or more network entities when the one or more network entities are re-authenticated.

In one aspect, the controller unit may be configured to detect a communication path loss over the data network, where the communication path loss may include a loss of communication between a data plane management component and the control plane.

Further, the communication path loss in a further aspect may include a non-acknowledgement of a keep alive message from the network switch.

The keep alive message in one embodiment may be associated with a wireless LAN service module.

In addition, when the controller unit is maintaining a respective one or more data paths, the controller may be configured to preserve one or more tunnel endpoints associated with the respective one or more network entities. Moreover, when the controller unit is refreshing the data forwarding state of the one or more network entities, the controller unit may be further configured to mark each of the one or more network entities as stale.

In still another aspect, the one or more network entities may be configured to initiate a predetermined scheduling for re-authentication in the data network, where the predetermined scheduling for re-authentication may be based on a re-authentication priority in accordance with one or more predetermined parameters. Furthermore, the one or more predetermined parameters may include re-authentication status of the one or more network entities, a frame count of the respective one or more network entities, and the number of the one or more network entities in the re-authentication process.

In yet still another aspect, the controller unit may be operatively coupled to an access point in a wireless local area network.

A system for providing continuous data forwarding during a failure mode in a data network in accordance with still another embodiment includes means for detecting a control plane failure mode of a network switch, means for maintaining a respective one or more data paths between one or more network entities with the network switch, means for detecting the network switch recovery from the control plane failure mode, means for re-authenticating the one or more network entities over the data network.

The various processes described above including the processes performed by the wireless domain service (WDS) on the wireless LAN service module (WLSM), the layer 3 mobility module (L3MM), and the access points (APs) 130A, 130B in the software application execution environment in the data network 100 including the processes and routines described in conjunction with FIGS. 2-5, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the respective wireless domain service (WDS) on the wireless LAN service module (WLSM), the layer 3 mobility module (L3MM), may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing continuous data forwarding during a failure mode in a wireless data network, comprising:
    establishing one or more tunneled data paths in the wireless data network, each of the one or more tunneled data paths extending between one of a plurality of access points of the wireless data network and a data plane management component of a network switch, each of the one or more tunneled data paths configured
        to carry data traffic from one or more mobile nodes communicating with the respective access point;
    detecting a failure of a control plane module of the network switch, the control plane module coupled to the data plane management component of the network switch and to the access points, and configured
        to handle authentication of the mobile nodes to the wireless data network;
    maintaining by the data plane management component and each access point the one or more tunneled data paths for use by mobile nodes that were authenticated to the wireless data network prior to the failure of the control plane module of the network switch;
    detecting a recovery of the control plane module of the network switch; and
    re-authenticating one or more mobile nodes following the recovery of the control plane module, wherein
        the re-authentication of the one or more mobile nodes occurs based on one or more predetermined parameters at the access points that provide for a balanced re-authentication among the one or more mobile nodes.

2. The method of claim 1 wherein the step of detecting the failure of the control plane module includes detecting a communication path loss over the wireless data network.

3. The method of claim 2 wherein the communication path loss includes a communication failure between the data plane management component and the control plane module.

4. The method of claim 2 wherein the communication path loss includes one or more of an absence of a keep alive message or a non-acknowledgement of a keep alive message from the network switch.

5. The method of claim 1 wherein the re-authenticating the one or more mobile nodes includes:
    marking each of the one or more mobile nodes as stale; and
    performing a predetermined scheduling of the re-authentication of the one or more mobile nodes.

6. The method of claim 5 wherein the performing the predetermined scheduling of the re-authentication includes:
    receiving data from one or more mobile nodes;
    determining a re-authentication priority based on the one or more predetermined parameters; and
    executing re-authentication of the one or more mobile nodes with the network switch.

7. The method of claim 6 wherein the one or more predetermined parameters include re-authentication status of the one or more mobile nodes, a frame count of the respective one or more mobile nodes, and the number of the one or more mobile nodes in the re-authentication process.

8. The method of claim 5 wherein
    the predetermined scheduling is initiated by one or more access point coupled to the network switch.

9. The method of claim 1 wherein the maintaining includes preserving one or more tunnel endpoints associated with the respective one or more mobile nodes.

10. A method of providing continuous data forwarding during a failure mode in a wireless data network, comprising:
    establishing one or more tunneled data paths in the wireless data network, each of the one or more tunneled data paths extending between one of a plurality of access points of the wireless data network and a data plane management component of a network switch, each of the one or more tunneled data paths configured
        to carry data traffic from one or more mobile nodes communicating with the respective access point;
    detecting a failure of a control plane module of the network switch, the control plane module coupled to the data plane management component of the network switch and to the access points, and configured
        to handle authentication of the mobile nodes to the wireless data network;
    marking one or more of the mobile nodes as stale;
    maintaining, by the data plane management component and each access point, tunnel interface states and an endpoint database of the tunneled data paths for use by mobile nodes that were authenticated prior to the failure of the control plane module of the network switch;

detecting a normal operational mode of the control plane module of the network switch; and updating a state of one or more of the mobile nodes following the detection of the normal operational mode of the control plane module based on a predetermined re-authentication schedule at the access points.

11. The method of claim 10 wherein the updating the state includes determining the re-authentication priority for each of the one or more mobile nodes.

12. The method of claim 10 further including purging the one or more mobile nodes whose state is not updated.

13. The method of claim 10 wherein the maintaining the tunnel interface states and the endpoint database includes forwarding data from the one or more mobile nodes to the network switch.

14. A system for providing continuous data forwarding during a failure mode in a wireless data network, comprising:

a controller unit operatively coupled to a data network, the controller unit configured to:

cooperate in the establishment of one or more tunneled data paths in the wireless data network, each of the one or more tunneled data paths extending between one of a plurality of access points of the wireless data network and a data plane management component of a network switch, each of the one or more tunneled data paths configured to carry data traffic from one or more mobile nodes communicating with the respective access point;

detect a failure of a control plane module of the network switch, the control plane module coupled to the data plane management component of the network switch and to the access points, and configured to handle authentication of the mobile nodes to the wireless data network;

maintain the one or more tunneled data paths for use by mobile nodes that were authenticated prior to the failure of the control plane module of the network switch;

detect a recovery of the control plane module of the network switch; and refresh a data forwarding state of one or more mobile nodes when the one or more mobile nodes are re-authenticated by the recovered control plane module.

15. The system of claim 14 wherein the controller unit is configured to detect a communication path loss over the data network.

16. The system of claim 15 wherein the communication path loss includes a loss of communication between a data plane management component and the control plane module.

17. The system of claim 15 wherein the communication path loss includes a non-acknowledgement of a keep alive message from the network switch.

18. The system of claim 17 wherein the keep alive message is associated with a wireless LAN service module.

19. The system of claim 14 wherein when the controller unit is refreshing the data forwarding state of the one or more mobile nodes, the controller unit is further configured to mark each of the one or more mobile nodes as stale.

20. The system of claim 19 wherein the one or more mobile nodes are configured to initiate a predetermined scheduling for re-authentication in the data network.

21. The system of claim 20 wherein the predetermined scheduling for re-authentication is based on a re-authentication priority in accordance with one or more predetermined parameters.

22. The system of claim 21 wherein the one or more predetermined parameters include re-authentication status of the one or more mobile nodes, a frame count of the respective one or more mobile nodes, and the number of the one or more mobile nodes in the re-authentication process.

23. The system of claim 14 wherein when the controller unit is maintaining a respective one or more data paths, the controller unit is configured to preserve one or more tunnel endpoints associated with the respective one or more mobile nodes.

24. A system for providing continuous data forwarding during a failure mode in a wireless data network, comprising:

means for establishing one or more tunneled data paths in the wireless data network, each of the one or more tunneled data paths extending between one of a plurality of access points of the wireless data network and a data plane management component of a network switch, each of the one or more tunneled data paths configured to carry data traffic from one or more mobile nodes communicating with the respective access point;

means for detecting a failure of a control plane module of the network switch, the control plane module coupled to the data plane management component of the network switch and to the access points, and configured to handle authentication of the mobile nodes to the wireless data network;

means for maintaining by the data plane management component and each access point the one or more tunneled data paths for use by mobile nodes that were authenticated to the wireless data network prior to the failure of the control plane module of the network switch;

means for detecting a recovery of the control plane module of the network switch; and means for re-authenticating one or more mobile nodes following the recovery of the control plane module, wherein the means for re-authenticating is based on one or more predetermined parameters at the access points that provide for a balanced re-authentication among the one or more mobile nodes.

\* \* \* \* \*

UNITED STATES PATENT AND TRADEMARK OFFICE
CERTIFICATE OF CORRECTION

Page 1 of 1

PATENT NO. : 7,813,267 B2
APPLICATION NO. : 11/468271
DATED : October 12, 2010
INVENTOR(S) : Chia Tsai et al.

It is certified that error appears in the above-identified patent and that said Letters Patent is hereby corrected as shown below:

Col. 7, Line 67, please replace "1110" with --110--

Signed and Sealed this
Tenth Day of May, 2011

David J. Kappos
*Director of the United States Patent and Trademark Office*